United States Patent
Shaw (10) Patent No.: US 7,434,008 B2
(45) Date of Patent: Oct. 7, 2008

(54) SYSTEM AND METHOD FOR COHERENCY FILTERING

(75) Inventor: Mark Shaw, Garland, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 362 days.

(21) Appl. No.: 10/831,050

(22) Filed: Apr. 23, 2004

(65) Prior Publication Data

US 2005/0240736 A1    Oct. 27, 2005

(51) Int. Cl.
G06F 12/00 (2006.01)

(52) U.S. Cl. .................. 711/146; 711/141; 709/212

(58) Field of Classification Search ............... 711/146
See application file for complete search history.

(56) References Cited

U.S. PATENT DOCUMENTS

| | | | |
|---|---|---|---|
| 5,900,015 A | 5/1999 | Herger et al. | |
| 5,966,729 A | 10/1999 | Phelps | |
| 6,115,790 A | 9/2000 | Schimmel | |
| 6,189,078 B1 * | 2/2001 | Bauman et al. | 711/156 |
| 6,199,147 B1 | 3/2001 | Smith et al. | |
| 6,374,329 B1 | 4/2002 | McKinney et al. | |
| 6,438,659 B1 | 8/2002 | Bauman et al. | |
| 6,622,214 B1 * | 9/2003 | Vogt et al. | 711/141 |
| 6,631,447 B1 * | 10/2003 | Morioka et al. | 711/141 |
| 6,662,277 B2 | 12/2003 | Gaither | |
| 2001/0051977 A1 * | 12/2001 | Hagersten | 709/203 |
| 2003/0005237 A1 * | 1/2003 | Dhong et al. | 711/146 |
| 2003/0070016 A1 | 4/2003 | Jones et al. | |
| 2003/0191905 A1 | 10/2003 | Chen et al. | |
| 2004/0022094 A1 * | 2/2004 | Radhakrishnan et al. | 365/200 |
| 2004/0181634 A1 * | 9/2004 | Taylor et al. | 711/140 |
| 2004/0215897 A1 * | 10/2004 | Arimilli et al. | 711/144 |

OTHER PUBLICATIONS

Alan L. Davis, et al., "The ccNUMA Memory Profiler", Sep. 5, 2001, pp. 1-13.
Michael Yang and Jeffrey Ma, "Cache Coherence in Distributed Computing Systems", ICS 242—Distributed Computing, Fall 2003, pp. 1-3.
Mark E. Shaw, "Superdome", www.interex.org/pubcontent/enterprise/sep01/shaw.jsp, Sep. 2001, pp. 1-6.

* cited by examiner

*Primary Examiner*—Kevin Ellis
*Assistant Examiner*—Hashem Farrokh (57) ABSTRACT

Systems and methods for coherency filtering are disclosed. A system may comprise a coherency filter that provides information identifying a coherency domain for data in an associated address space based on an identifier for the data. A snoop engine is configured to snoop for the data in the identified coherency domain based on the information and the identifier.

33 Claims, 5 Drawing Sheets

SYSTEM AND METHOD FOR COHERENCY FILTERING

BACKGROUND

Various approaches exist to implement multi-processor systems, including, for example, traditional symmetric multi-processor (SMP) designs and cache coherent non-uniform memory access (ccNUMA) designs. ccNUMA systems generally are capable of scaling to higher processor counts since a ccNUMA system is not limited by a single shared resource. In a ccNUMA system, the processors have direct access to all the memory located anywhere in the system. Performance characteristics and scalability in the ccNUMA and other systems, however, tend to vary according to where the memory is allocated. This is because there is an increased performance cost associated with using global memory versus using local memory. The increased cost is particularly evident in large snoopy-based coherency systems, since overhead associated with snooping in large systems can overload the interconnect fabric and reduce performance.

SUMMARY

One embodiment of the present invention may comprise a system that includes a coherency filter that provides information identifying a coherency domain for data in an associated address space based on an identifier for the data. A snoop engine is configured to snoop for the data in the identified coherency domain based on the information and the identifier.

Another embodiment of the present invention may comprise a multi-processor system. The multi-processor system includes caches associated with a plurality of memory accessing devices located in the multi-processor system, the caches defining at least a portion of an associated address space. A first interconnect communicatively couples a first set of the plurality of memory accessing devices to each other locally. A second interconnect communicatively couples the first set of plurality of memory accessing devices to at least a second set of the plurality of memory accessing devices. A filter system is operative to identify one of at least two coherency domains based on an identifier associated with a block of data, the at least two coherency domains defining the associated address space that is supported by the filter system. At least one snoop for the block of data is selectively sent via at least one of the first and second interconnects based on which one of the at least two coherency domains is identified by the filter system for the block of data.

Another embodiment of the present invention may comprise a system that includes means for identifying a coherency domain associated with a block of data in an address space. The system also includes means for selectively targeting snoops for the data to a subregion of the address space based on the identified coherency domain and based on an address that identifies the data.

Another embodiment of the present invention may comprise a method that includes identifying a coherency domain for a block of data based on an address associated with the block of data. The method also includes broadcasting at least one snoop for accessing the block of data in a region of an associated address space based on the identified coherency domain and the address.

DETAILED DESCRIPTION

Figure 1:
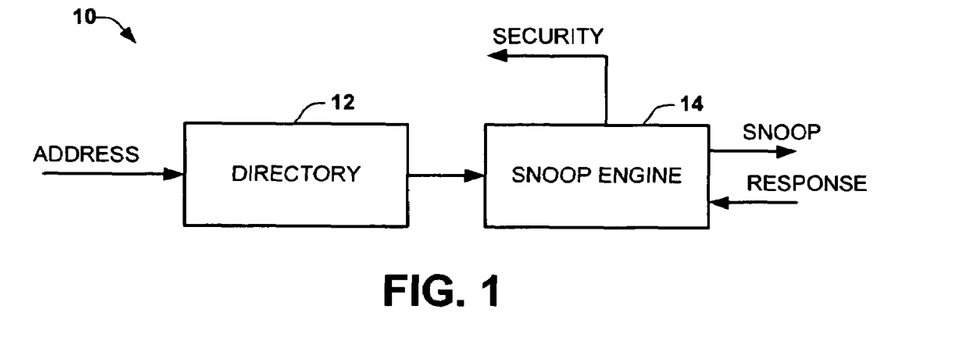
FIG. 1 depicts an embodiment of a coherency filter system.

FIG. 1 depicts an example of a filter system 10 that can be utilized to selectively direct snoops for desired data. The filter system 10 can be implemented as hardware, software or a combination of hardware and software configured to implement the functions described herein. For instance, the filter system 10 can be implemented as an application specific integrated circuit (ASIC) that affords desired scalability in multi-processor systems.

The filter system 10, for example, can be implemented in a multi-processor system, such as a distributed shared memory system. In a multi-processor system, the filter system 10 can be implemented in one or more crossbars, co-located with individual processors or at any juncture where the multi-processor system might scale out. The filter system 10 affords improved scalability since the filter system can mitigate at least some unnecessary snoop traffic. By limiting snoop traffic in the multi-processor system, improved interconnect bandwidth may be available for scaling out to implement a larger capacity system. The filter system 10 can also provide additional security as well as partitioning of a memory address space in the multi-processor system.

As shown in FIG. 1, the filter system 10 receives an identifier, such as an ADDRESS, associated with a block of data. The ADDRESS can correspond to a tag address associated with a transaction for accessing the block of data, such as may be provided in connection with a request or other command by a memory accessing device, such as a processor or I/O controller. The transaction, for example, can correspond to a request (e.g., a read or write request) or other command for accessing the block of data identified by the ADDRESS. The block of data, for example, can be a line of data (e.g., a cache line), a group of two or more cache lines or any other organizational data structure utilized to store and transfer data.

The filter system 10 is programmed and/or configured to control snoop traffic for the block of data in an associated address space. The filter system 10 classifies the data in a coherency domain. The filter system 10 then selectively broadcasts a SNOOP to a desired subset of one or more caches located in a corresponding address region of the address space based on the coherency domain. The filter system 10 can receive one or more responses to the SNOOP, which responses can include a copy of the desired data as well as an update message. The update message can include information (e.g., ownership information, state information, status information, etc.) that enables the filter system 10 to update corresponding coherency information to facilitate subsequent selectively snooping for data in proper regions of the address space.

In the example of FIG. 1, the filter system 10 includes a directory 12 that maintains directory information for data in an associated address space. As described herein, the address space can correspond to a defined memory region, such as a partition or set of plural partitions. A partition corresponds to a region of an address space that includes a plurality of caches, typically associated with one or more processors and input/output (I/O) controllers, as well as shared main memory. The designation of whether a processor, its associated cache and the I/O controllers form part of a given partition can be established, for example, at boot time or, alternatively, on-the-fly such as during a dynamic partitioning of the memory. A partition further can include two or more subregions that define respective coherency domains for the respective partition in the address space.

The directory 12 can include one or more memory devices configured to store classification information and coherency information associated with data in a given partition. The classification information can identify a coherency domain for the data in the partition. The directory 12 thus provides a snoop engine 14 classification data that identifies an associated coherency domain in the address space for the block of data based on the ADDRESS. The classification data can also be expanded to identify one or more of a plurality of distinct coherency domains, which may be referencing the block of data. The directory can also provide coherency information to the snoop engine for the block of data. The coherency information can identify a coherency state for the block of data according to the cache coherency protocol being employed (e.g., two bits to encode status in a traditional MESI (modified, exclusive, shared, invalid) protocol).

As an example, the directory 12 can be implemented as a memory structure, such as a content addressable memory (CAM), operative to classify the ADDRESS as being assigned to a respective coherency domain. Alternatively, the directory 12 can be implemented as random access memory (RAM) configured as a programmable look-up table that identifies a coherency domain for one or more owners of the data identified by the ADDRESS. Additionally, a corresponding directory cache can be associated with the RAM to maintain additional directory information associated with a set of frequently used or predetermined addresses data in the address space. As another alternative, the directory 12 can classify a subregion of the coherency domain. For instance, the directory 12 may provide classification information in response to the ADDRESS to identify a relative proximity in the address space for a corresponding block of data. The relative proximity can be determined according to where the filter system 10 is located or relative to where the device that initiated a transaction having the ADDRESS is located.

As mentioned above, the directory 12 provides the directory information (e.g., classification and coherency information) to the snoop engine 14. The snoop engine 14 is configured to SNOOP selected cache coherency domains in the associated system for the block of data based on the directory information provided by the directory 12. The specificity of the particular address region(s) of the address space targeted by the snoop engine can vary depending upon the implementation of the directory 12 and the granularity of directory information being provided.

For instance, a low granularity directory 12 can provide classification information that enables the snoop engine 14 to selectively snoop a small subset of two or more subregions of the address space (e.g., a local region or a global region). By configuring the filter system to selectively snoop within only defined regions of the address space, the filter system 10 is capable of providing security and partitioning functions as well as limiting the amount of traffic communicated through the associated interconnect fabric throughout the address space.

By way of further example, assume that the filter system 10 is configured to support data located within a given partition, which includes two subregions, namely, a local coherency domain and a global coherency domain. If the directory 12 provides directory information that classifies the ADDRESS input as being assigned to the local coherency domain, the snoop engine 14 snoops a local region only. By limiting the snoop traffic to the local region, interconnect bandwidth is conserved since unnecessary snoops are not transmitted over global interconnects. As another example, the snoop engine 14, can snoop a global region of the address space when the directory information from the directory 12 classifies the ADDRESS input as being assigned to the global coherency domain. Additionally or alternatively, the classification information can identify one or more particular regions or caches associated with memory accessing devices in the local or global coherency domain.

Those skilled in the art will understand and appreciate that the directory 12 can provide directory information to the snoop engine at other levels of granularity than the two levels (e.g., local and global) mentioned above. For example, a higher granularity directory 12 may provide directory information that enables the snoop engine 14 to selectively snoop more than two subregions in the address space or even a particular owner of the desired data (a cache having a current copy of the data), such as by the directory information classifying data into more than two coherency domains.

Those skilled in the art will also understand and appreciate the filter system 10 can be adapted to operate in conjunction with various types of cache coherency protocols, including null-directory protocols and broadcast-based (or snoopy) protocols. The filter system 10 can also be utilized in a multi-processor system employing a directory-based protocol, such as by replacing or augmenting the directory function implemented by the protocol.

Figure 2:
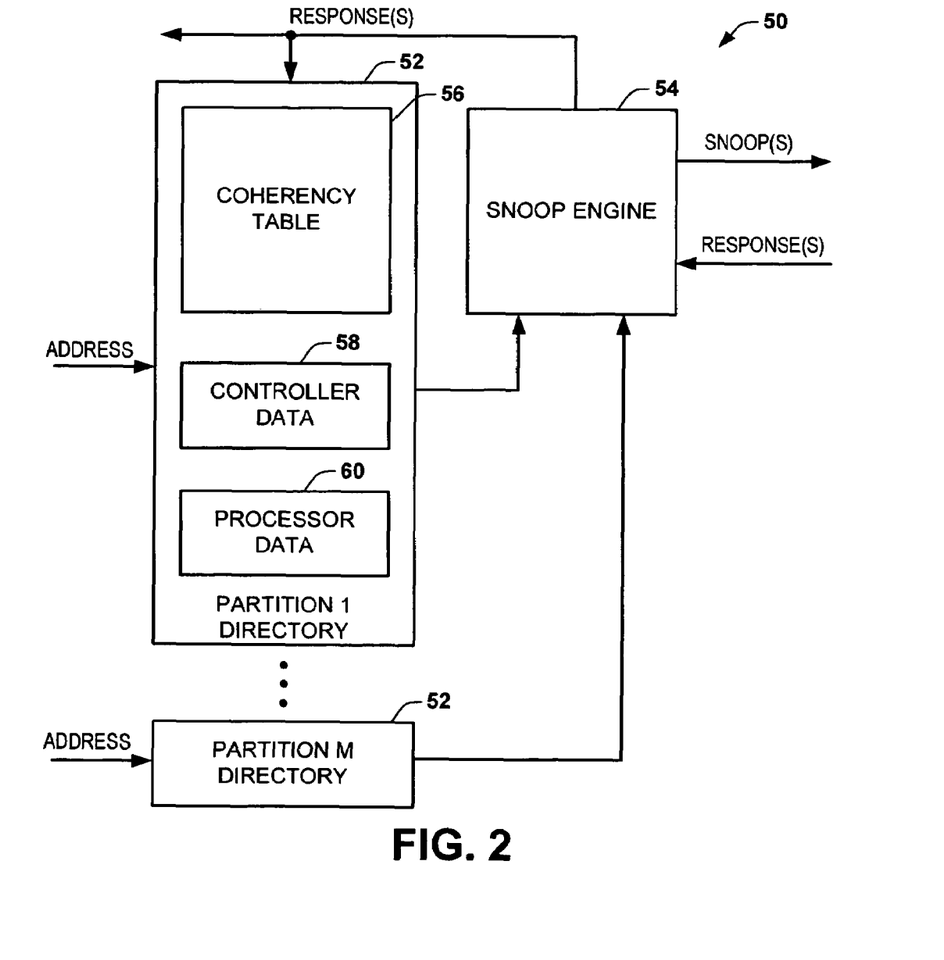
FIG. 2 depicts another embodiment of a coherency filter system.

FIG. 2 depicts an example of another filter system 50. The filter system 50 includes a plurality of partition directories 52 indicated at PARTITION 1 directory through PARTITION M directory, where M is a positive integer denoting the number of partitions in an associated aggregate address space. For instance, each of the partition directories 52 can operate as a corresponding coherency filter for a respective partition of the aggregate address space serviced by the filter system 50. The aggregate address space, for example, can correspond to an aggregate address space in an associated distributed shared memory multi-processor system. Each of the respective partition directories 52 is operative to classify a block of data, based upon an ADDRESS input, as being assigned to one of two or more predetermined coherency domains in the corresponding partition.

For example, each partition directory 52 can provide a corresponding directory signal to an associated snoop engine 54. While a single snoop engine 54 is depicted in FIG. 2, separate snoop engines can be associated with each directory 52. The directory provides directory information to the snoop engine 54 that classifies one or more blocks of data associated with an ADDRESS as being assigned to a coherency domain, such as a local or global coherency domain. Other coherency domain classifications can also be utilized in each respective partition in the address space, such as a reserved domain or an intermediate domain. Those skilled in the art will appreciate that by implementing the partition directories 52 to identify a coherency domain for a block of data based on the ADDRESS, snoop traffic on the interconnect fabric can be mitigated. The snoop traffic thus can be mitigated since the snoop engine 54 broadcasts snoops using local interconnects for the subset of addresses that are assigned to the local coherency domain and only employs the global interconnects and switch fabric only for data classified in the global coherency domain.

In the example of FIG. 2, for purposes of simplicity of explanation, only the contents of PARTITION 1 directory are depicted. Those skilled in the art will understand and appreciate that each of the respective partition directories 52 can be similarly configured. PARTITION 1 directory includes a coherency table 56 that maintains directory information associated with a corresponding partition of the address space. The directory information can include classification data that identifies one of at least two coherency domains based on the ADDRESS as well as coherency data for the data stored in the corresponding partition.

The coherency table 56 is operative to provide the classification data at a desired granularity, generally depending upon the structure implementing the coherency table. For instance, the coherency table 56 can be implemented as a high granularity off-chip RAM that contains coherency and location information associated with each block of data in the partition. Alternatively, the coherency table 56 can be implemented as a partial directory structure (e.g., implemented in an on-die static RAM (SRAM)) that identifies a page, group or other memory region having a plurality of lines of data in the corresponding partition of the aggregate address space. The particular size or number of lines of data that may be grouped in such a manner can be configurable, and further may vary according to the capability of the coherency table 56.

Additionally or alternatively, a cache (not shown) can be associated with the coherency table 56 for identifying more frequently accessed memory locations. The memory locations identified by the cache of the coherency table can provide location information with greater specificity than the RAM portion of the coherency table, such as by cache line.

The PARTITION 1 directory can also include controller data 58 and processor data 60 that identifies physical memory locations in the corresponding partition (e.g., partition 1) of the address space. For instance, the controller data 58 maintains a list of I/O controllers in partition 1. Similarly, the process for data 60 provides a list of all CPUs in partition 1. In this way, the controller data 58 and processor data 60 enable the snoop engine 54 to direct the snoops to appropriate resources in the partition for accessing the data specified by the ADDRESS. While the controller data 58 and processor data 60 are depicted as being part of the PARTITION 1 directory 52, it will be understood and appreciated that such data can be stored separately from the directories 52.

By way of further example, the snoop engine 54 broadcasts the SNOOP to access data within the corresponding partition 1 based on the coherency domain identified by the directory information and based on the ADDRESS provided to the partition directory 52. For instance, if an ADDRESS is classified as local, the snoop engine can broadcast the SNOOP locally (e.g., without using global interconnects) to a subset of CPUs and the I/O controllers in the partition. In contrast, if the ADDRESS is classified as global, the snoop engine 54 broadcasts the SNOOP to additional I/O controllers and other CPUs that form part of the respective partition. The snoop engine 54 receives one or more RESPONSES to the broadcast SNOOPS. The snoop engine 54 includes resources for managing snoops and tracking responses to the respective snoops, such including an in-flight table or other resources. The snoop engine 54 can also provide the RESPONSE(S) to the respective partition directories 52 in order to update the corresponding coherency table 56.

Figure 3:
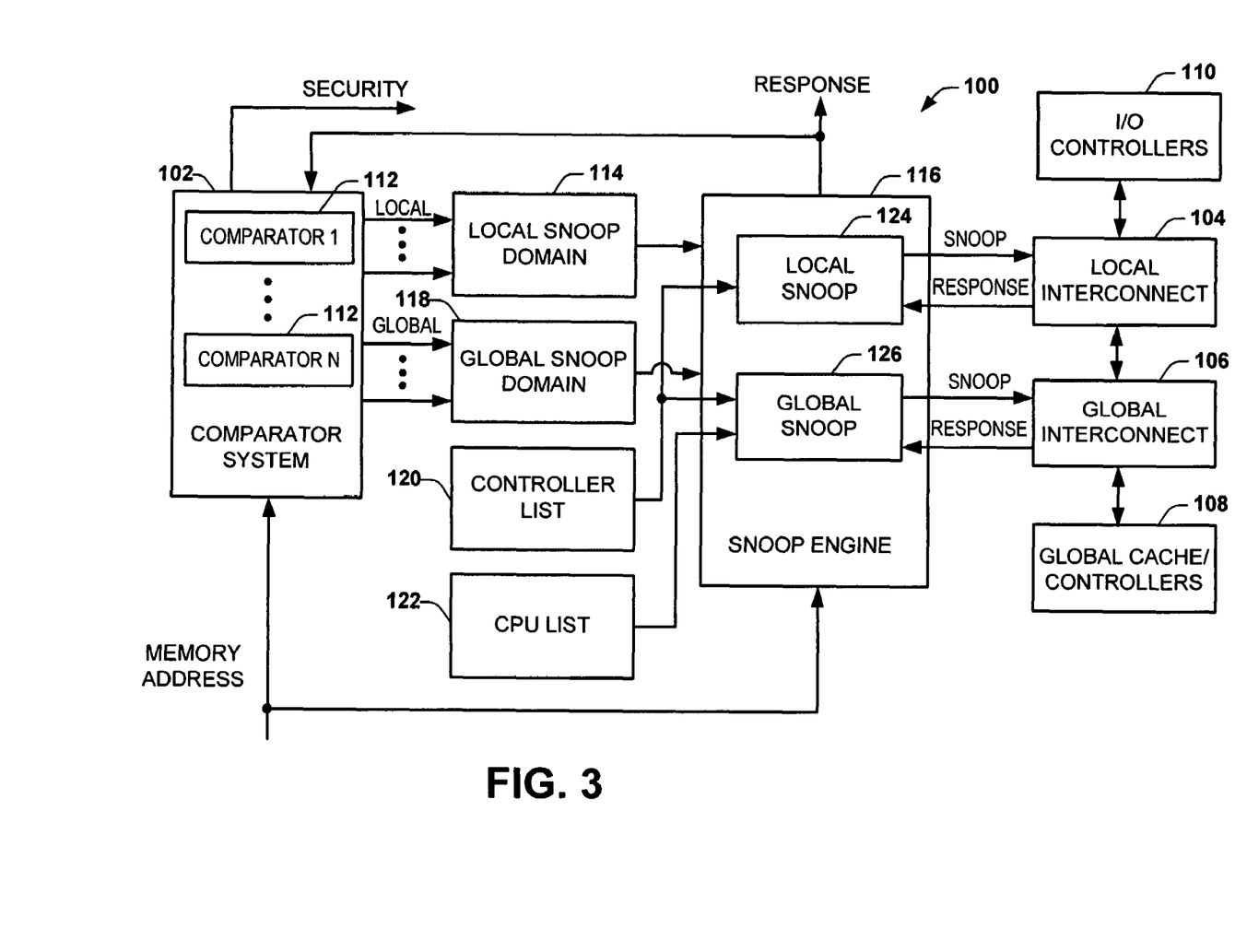
FIG. 3 depicts yet another embodiment of a coherency filter system.

FIG. 3 depicts another example of a filter system 100. The filter system 100 includes a comparator system 102 that receives a MEMORY ADDRESS that identifies desired block of data. The MEMORY ADDRESS can be associated with a transaction for the block of data, such as a request or other command provided by a memory accessing device. The comparator system 102 is configured to identify a coherency domain for the block of data based on the MEMORY ADDRESS. As an example, the coherency domain for the block of data can correspond to a local domain or a global domain. A local domain, for example, corresponds to local memory regions in an address space, such as that can be accessed via one or more local interconnects 104.

The local interconnect 104 can be provided (e.g., on a cell board) to enable communication between a plurality of processors as well as communication with one or more associated input/output (I/O) controllers. For instance, each of the local processors and local I/O controllers can include one or more corresponding caches. The communications over the local interconnect 104 thus enables access to shared memory on the local components communicatively coupled to each other via the local interconnect.

A global domain corresponds to one more memory regions in the address space communicatively coupled to the filter system 100 through a global interconnect 106. The global interconnect 106 can correspond to one or more crossbar structures (e.g., crossbar ASIC), hierarchical switches, a switch fabric or the like, that communicatively couple subsystems (e.g., cell boards) of an associated multi-processor system. The global interconnect 106 provides access to global cache structures and global I/O controllers, such as may be implemented on a plurality of cell boards in a distributed cell memory system. The global caches/controllers are schematically indicated at 108.

As an example, selected portions of memory in each memory subsystem can be assigned to the local coherency domain (or local address space) and to a global coherency domain (or global address space). For instance, the cache associated with each processor or I/O controller might have a first percentage of its memory assigned to the local domain and a second percentage of its memory assigned to the global domain. To improve performance, a greater amount of memory in a given processor's cache might be assigned to the local domain than to the global domain. In this way, a global classification typically will result in one or more remote memory regions in a given partition being snooped through the global interconnect 106 as well as one or more local memory regions in the global domain being snooped, such as through the local interconnect 104. Thus, the global domain can include an aggregate of distributed memory assigned to the domain, which collectively is greater than the local memory region in each individual local domain.

In a partitioned memory system, each partition in the total address space can implement a similar organization of local and global address spaces. One or more filters can be distributed in the multi-processor system for each respective partition. The filter system 100 thus can be configured to classify a given MEMORY ADDRESS as local or global for the aggregate address space for each respective partition.

A MEMORY ADDRESS not corresponding to data in a given partition corresponds to a non-hit, which can result in the comparator system 102 providing SECURITY information. The SECURITY information can identify the occurrence of a security violation. A security violation can exist, for example, when a MEMORY ADDRESS is input to the comparator system 102 for data residing in a different partition from that supported by the filter system 100. The SECURITY information can be provided to appropriate system level security features, such as implemented by the operating system, and/or logged to identify a security violation. Alternatively or additionally, the comparator system 102 can provide the SECURITY information to classify a memory address as belonging to an illegal, reserved or restricted region of memory. A restricted or reserved region may be in the partition supported by filter system 100 or it may be in a different partition.

As illustrated in FIG. 3, the comparator system 102 can include a plurality of comparators 112, indicated at COMPARATOR 1 through COMPARATOR N, where N is a positive integer denoting the number of comparators. The number of comparators 112 may vary depending on, for example, the size of the partition supported by the filter system 100. Each comparator 112 can be configured to provide a corresponding logical output signal indicating a local or global classification for a MEMORY ADDRESS. For example, the comparator system 102 can be implemented as content addressable memory (CAM) that is indexed by the MEMORY ADDRESS to provide corresponding classification data (e.g., a single bit or multi bit output) as a function of the MEMORY ADDRESS.

For instance, in a case where each of the comparators 112 provide a logical output corresponding to either a local or global classification, a single bit of classification data can be utilized. When a greater degree of specificity or other classifications may be desired, more than one bit can be used. In the example of FIG. 3, the comparators 112 provide LOCAL outputs to a local snoop domain block 114, which can implement a logical "OR" function to provide a corresponding signal to a partition snoop engine 116. Similarly, the global outputs are provided to a global snoop domain block 118 that performs a logical "OR" function, which provides a corresponding logical output to the partition snoop engine 116. The MEMORY ADDRESS is also provided to the snoop engine 116 in addition to the classification information from the snoop domain blocks 114 and 118. Those skilled in the art will understand and appreciate various other implementations that can be utilized to provide a desired classification for a MEMORY ADDRESS.

The filter system 100 also includes a controller list 120 and a CPU list 122 that provide location information to the snoop engine 116. The controller list 120 and the CPU list 122 collectively provide information identifying potential owners of the data in each of the subregions of the partition. For instance, the controller list 120 can identify tag addresses corresponding to physical locations for I/O controllers in the partition. The controller list 120 can be provided to both a local snoop component 124 and a global snoop component 126. The controller list 120 can identify tag addresses in the respective partition that can be accessible via the local interconnect 104 as well as I/O controllers accessible via the global interconnect 106. The local snoop component 124 is configured to snoop the local coherency domain of the partition via the local interconnect 104 based on the classification information provided by the local snoop domain block 114, by the MEMORY ADDRESS and by the controller list 120. The local snoop component 124 employs resources of the snoop engine 116 to manage local snoops and track responses.

The CPU list 122, for example, can be provided to the global snoop component 126 to enable snooping of other CPU's in the partition. The global snoop component 126 also snoops based the I/O controllers (as provided by the controller list 126) when the memory address is classified as global. That is, the global snoop component 126 snoops both I/O controllers (in the local and global domains) as well as caches of CPU's in the global domain. The foregoing approach assumes that caches of CPU's of the local domain are snooped internally, separately from snooping implemented by the filter system 100. It will be understood and appreciated that, alternatively, the local snoop component 124 can be configured to snoop local processors via the local interconnect to and if the comparator system 102 classifies the memory address as local.

Each of the local snoop component 124 and the global snoop component 126 is operative to snoop the address space of the partition based on the classification of the data identified by the MEMORY ADDRESS. If the comparator system 102 classifies the MEMORY as local, the local snoop component 124 broadcast snoops to the local interconnect 104 for snooping the local I/O controllers in the partition according to the controller list 120. In response to the snoop from the local snoop component 124, the local I/O controllers 110 can send responses back to the partition snoop engine 116.

The global snoop component 126 operates in a similar manner in response to the comparator system 102 classifying a MESSAGE ADDRESS as global. The global snoop component 126 broadcast snoops to the global interconnect 106, which can be broadcast to both the global cache/controllers 108 some of which can include local I/O controllers 110 accessible via the local interconnect the partition. That is, the global snoop component 126 can broadcast its snoops to any memory region in the partition that is assigned to the global domain, regardless of its physical location within the address space.

The snoop engine 116 employs resources to manage snoops and track responses to snoops provided by each of the local and global snoop components 124 and 126, respectively. For instance, if an expected snoop response is not received by one of the snoop components, the transaction may time out and an error handling procedure may be implemented, such as retrying the snoop. Those skilled in the art will understand and appreciate various mechanisms that can be implemented by the partition snoop engine 116 for error handling and to ensure forward progress of transactions.

The partition snoop engine 116 can also provide a corresponding response to the comparator system 102 based on the snoop response (or responses) received from the I/O controllers 110 or the global cache/controllers 108. The response message can contain location information and/or coherency information indicative of the state of the data identified by the MEMORY ADDRESS. For instance, the caches associated with I/O controllers 110 and the global cache/controllers 108 can be implemented as write-back caches that cast out data and provide a response message. The filter system 100 can employ the response message to dynamically update the comparator system 102. That is, the filter system 100 can implement appropriate controls, such as associated the comparator system 102 (not shown), for updating one or more of the comparators 112 in the comparator system based on the response message. In this way, the comparator system 102 can provide classification information that reflects the current state of data in the address space of the partition supported by the filter system.

Figure 4:
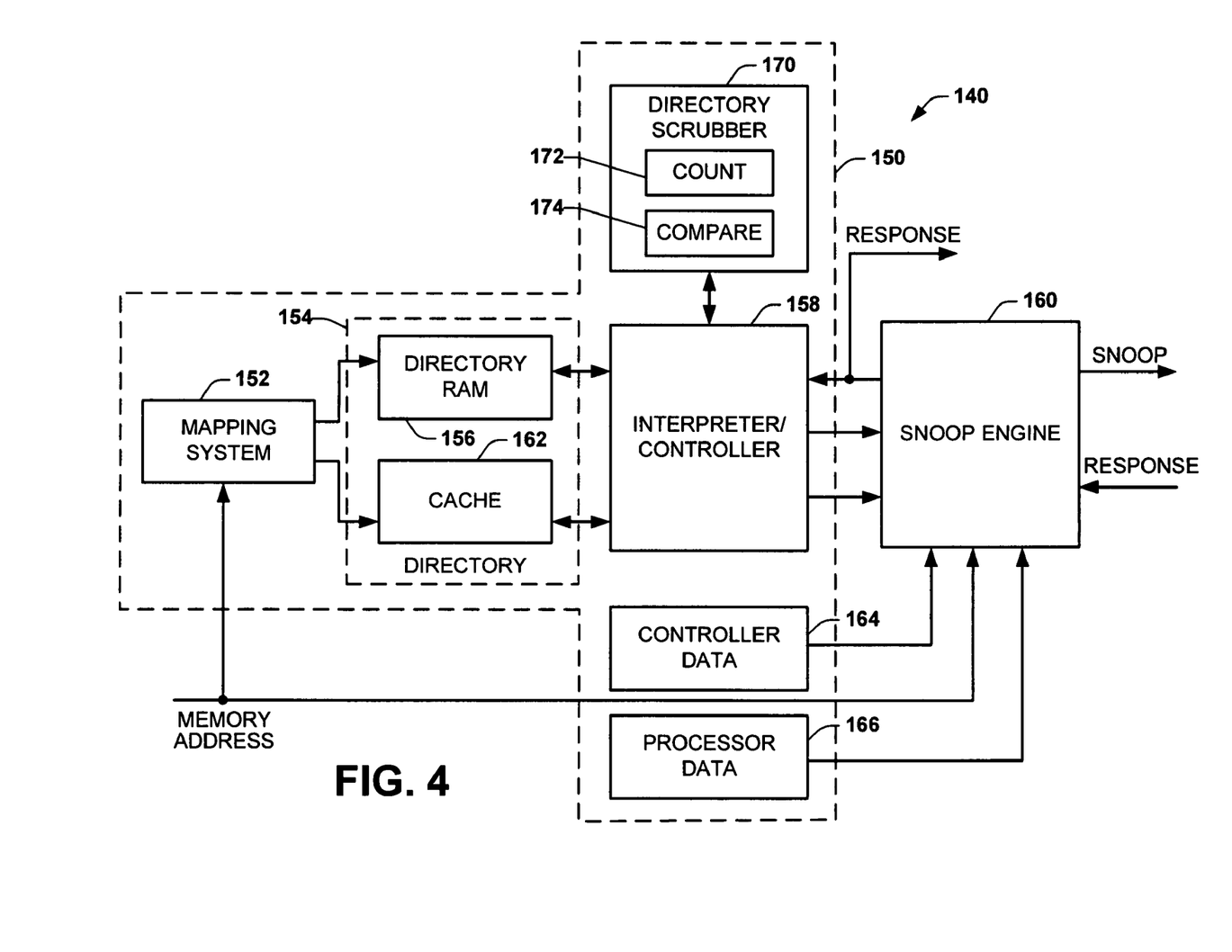
FIG. 4 depicts still another embodiment of a coherency filter system.

FIG. 4 depicts another example of a filter system 140 that is operative to control snooping based on a MEMORY ADDRESS that identifies a desired block of data. The filter system 140 includes a directory system 150 programmed and/or configured to identify a coherency domain based on the MEMORY ADDRESS. The coherency domain for the data can indicate a relative proximity for the data in an address region, such as one or more partitions of an aggregate address space. The aggregate address space can contain any number of one or more partitions. For example, the directory system 150 thus can classify the data as local or global in response to a MEMORY ADDRESS. The classification of the data further can be expanded to identify a region in the address space with greater particularity, such as by indicating a distinct region in the local or global domain or even identifying cache associated with one or more memory accessing devices (e.g., potential owners) presently referencing the data. The directory system 150 can also identify coherency state information associated with a block of data based on the MEMORY ADDRESS.

The directory system 150 includes a mapping system 152 that is operative to convert the MEMORY ADDRESS to a corresponding block tag address. The mapping system provides the block tag address to a directory 154. The block tag address identifies a corresponding memory block of data in which the MEMORY ADDRESS resides. A memory block can correspond to any part of a memory line, an entire memory line (e.g., a cache line) or span across multiple lines, such as to form one or more memory pages. For example, an associated operating system may map a memory page to a given process (e.g., each page having from about 4 Kbytes to about 1 Mbyte per page), with the mapping system 152 mapping each memory block to a corresponding operating system page based on the MEMORY ADDRESS.

The directory 154 can be programmed to implement a look-up table or other data structure operative to identify a coherency domain for the data based on the block tag address provided by the mapping system 152. The directory 154 cooperates with the mapping system 152 to provide broader classification information for the MEMORY ADDRESS, such as based on a block tag address provided by the mapping system 152. Those skilled in the art will appreciate various hierarchical levels of classification that can be implemented by the directory 154 to classify the data based on the information provided by the mapping system 152.

In the example of FIG. 4, the directory 154 includes a directory RAM 156 that is configured to provide classification data indicating a corresponding coherency domain classification based on a block tag address provided by the mapping system 152. By way of example, the directory RAM 156 determines whether a corresponding block of data (based on the block tag address provided by the mapping system 152) corresponds to a local owner of the data or a global owner that may be external relative to where the filter system 140 is implemented. In this example, a local owner corresponds to an owner of the data (e.g., a processor's cache or I/O controller's cache) identified by the MEMORY ADDRESS that can be accessed without use of global interconnects or fabric networks. A local classification by the directory RAM 156 results in snooping using local interconnects to snoop the owner for the data. In contrast, an external owner corresponds to an owner of the data that is located remotely relative to the filter system 150. A global classification results in snooping one or more external owners typically including snooping via one or more global interconnects or fabric networks.

The directory RAM 156 can be implemented, for example, as an on-die SRAM. The size of the directory 154 further can be reduced to provide a partial directory structure by classifying blocks of memory, such as pages defined by an associated operating system. The directory size can be reduced and thereby be implemented at a reduced cost when compared to a full directory structure that identifies the particular owner of the data. The directory RAM 156 can also maintain coherency information for each respective block of memory in the memory region supported by the filter system 140. For instance, the directory RAM 156 can store a classification field, which can include one or more bits depending upon the granularity of location classification information. The location information, for example, can include a single classification bit that identifies a given block of memory as being local or external relative to the filter system. Additionally, a multi-bit classification field can also store coherency information, such as identifying the coherency state for the block of data (e.g., modified, exclusive, shared, and invalid) according to the coherency protocol being utilized. Those skilled in the art will understand and appreciate that the filter system 140 is not limited to any particular coherency protocol. The directory RAM 156 can provide the classification and coherency information to provide any desired level of specificity.

As a first example, the directory RAM 156 can employ four bits for classification and coherency information. For instance, two bits can be provided for identifying cache coherency status (e.g., according to the MESI coherency protocol), one bit for identifying the data as local and one bit for identifying the data as global.

As a second example, the directory RAM 156 can employ two bits for cache coherency status, one bit to identify whether the data is in the global coherency domain, and Q bits to identify one domain of a plurality of possible domains (where Q is a positive integer sufficient to encode the number of coherency domains in the address space). This approach enables the directory RAM 156 to identify specifically which memory accessing device (e.g., CPU or I/O device) is presently accessing a block of data corresponding to the MEMORY ADDRESS. The global bit can be set to indicate a situation when there are at least two sharers for the data and that broadcasts should be made.

As a third example, the directory RAM 156 can employ two bits for cache coherency status, one bit to indicate whether the data is in the local coherency domain, one bit to identify whether the data is in the global coherency domain, and R bits to indicate one distinct remote domain (where R is a positive integer sufficient to encode the number of coherency domains in the address space). This is similar to the example in the preceding paragraph, but adds an additional bit to identify the local domain. The local domain bit provides an inexpensive additional level of encoding to allow an identification of two domains referencing the same block of data, for example, local and remote domains.

According to a fourth example, the directory RAM 156 can provide two bits for cache coherency status information, one bit to indicate whether the data is in the local coherency domain, one bit to identify whether the data is in the global coherency domain, and SxT bits to indicate one distinct remote domain (where T is a positive integer sufficient to encode the number of coherency domains in the address space and S is a positive integer denoting the number of domains referencing the block of data). For instance, this allows the directory RAM 156 to identify two or more domains that may be sharing a block of data.

The directory RAM 156 provides the classification information and coherency information to an interpreter/controller 158. The interpreter/controller 158 is programmed and/or configured to interpret the results of the directory look-up as well as for updating the directory RAM 156. For instance, the interpreter/controller 158 can receive responses from an associated snoop engine 160 and employ the responses or at least a portion thereof to update entries in the directory RAM 156. The updates for the directory RAM can correspond to modifying classification information associated with one or more memory blocks. Additionally or alternatively, the new tag updates may also modify coherency information associated with a block of data, also based on snoop responses received by the snoop engine 160. The interpreter/controller 158 can modify coherency information, for example, by entering a new or modified state of the data according to the cache coherency protocol being implemented.

The classification information field maintained by the directory RAM 156 can be enhanced by employing more than one bit. A greater number of bits can thus be utilized to define more than two coherency domains, although the overhead associated with the filter system 140 will increase accordingly. For instance, a performance improvement can be achieved by employing two bits: one bit to indicate whether a block is local or global and a second bit to identify whether a global line is owned by a processor or an I/O controller. This improvement thus can enable the filter system 140 to better control how snoops are directed since snoops for data in cache associated with an I/O controller are usually directed to specific memory regions. Two more bits for classification thus allow the filter system 140 to provide another degree of control to limit the amount of snoop traffic that is transmitted to the I/O controllers or to external processors.

As depicted in FIG. 4, the directory 154 can also include a cache 162. The cache 162, for example, can provide a "hotline" cache that may identify an owner of data with greater specificity than the classification provided by the directory RAM 156. The directory RAM 156 and the cache 162 can implement different hierarchical classification levels according to the tag addresses provided by the mapping system 152. The mapping system 152 can be configured to provide different types of tag addresses to each of the directory RAM 156 and the cache 162. That is, the tag address provided to the cache 162 can identify a location of the owner of the data identified by the MEMORY ADDRESS with a greater amount of specificity (e.g., a tag address for a given cache line) than the block tag address provided to the directory RAM 156 (e.g., a tag address for a memory block having plural cache lines, such as a page).

For example, if the directory RAM 156 is configured to classify a block of data (e.g., an operating system page) as local or global, the cache 162 can be utilized to identify the location in the address space for the specific owner of a given cache line based on a tag address provided by the mapping system 152. The cache 162 can be utilized to identify a cache line or any other unit of memory that is smaller than (e.g., a subset of) the block of data being classified by the directory RAM 156. In this way, when the cache 112 identifies an owner, the snoop engine 160 can target a snoop directly to the identified owner.

The cache 162 can be implemented as a queue or other programmable data structure that maintains identifying information for the owner of a given line of data and coherency information associated with a predetermined subset of memory addresses in the memory region supported by the filter system 140. Alternatively or additionally, the cache 162 can be programmed and/or configured to enable coherency information and ownership information to be stored for a programmable set of memory lines. In this way, the hot-lines can improve performance for certain sections of executing code, such as where multiple processors and I/O controllers are utilizing a small, shared data set. The cache 162 can be managed and updated by the interpreter/controller 158, such as based on the relative frequency in which data is accessed. Alternatively or additionally, the operating system itself may program the cache 162 based on requirements of application programs being executed.

The cache 162 provides coherency and location information to the interpreter controller 158 based on a tag address from the mapping system 152. The information from the cache 162 enables the interpreter controller 158 to provide more detailed information (e.g., a more narrow classification level) to the snoop engine 160. The cache 162 thus enables the snoop engine 160 to provide targeted snoops selectively to the owner (or a small subset of potential owners) of data based on the MEMORY ADDRESS. As a result of such owner-targeted snooping, bandwidth for broadcasting can be mitigated in systems even in situations when the owner is located externally relative to the filter system 150.

The directory also includes controller data 164 and processor data 166 that provide location information to the snoop engine 160 for potential snoop destinations (e.g., potential owners of the data) in the partition or other logical memory region supported by the filter system 140. For instance, the controller data 164 can identify tag addresses corresponding to physical locations for I/O controllers in the partition. The processor data 166 similarly can identify tag addresses for processor caches distributed throughout the partition, which caches can be accessible via the local and global interconnects.

The snoop engine 160 thus provides coherency snoops based on the interpreted classification information, the controller data, the processor data and the MEMORY ADDRESS. For instance, if the interpreter controller 158 identifies the MEMORY ADDRESS as local, the snoop engine 160 provides a coherency snoop locally based on the MEMORY ADDRESS, and does not broadcast the snoops to the rest of the system via global interconnects. Alternatively, if the interpreter controller 158 provides interpreted coherency information that indicates the MEMORY ADDRESS corresponds to an external owner, the snoop engine 160 provides the coherency snoops as global broadcasts to the entire system. As another alternative, the snoop engine 160 can provide a targeted SNOOP to one or more potential owners, as identified by the cache 162.

As mentioned above, the snoop engine 160 can globally broadcast coherency snoops to I/O controllers as well as to external CPUs located throughout the system. This distinction between local and global snoops assumes that local CPUs are snooped locally over a local processor bus separately from snooping implemented by the filter system 140 and, therefore, are not required to be snooped by the snoop engine 160. Those skilled in the art will understand and appreciate that the local processors can, alternatively, be snooped by the snoop engine 160 based on interpreted classification information for both local and global classifications of data.

The snoop engine 160 also includes resources operative to track and manage snoops provided by the snoop engine. For example, the snoop engine 160 can maintain an in-flight table or other mechanism that includes one or more entries for each outstanding transaction for which a responses is expected. Upon receiving one or more responses, the snoop engine 160 can make updates to the appropriate transaction entry and upon completion of the transaction, retire the entry. The snoop engine 160 also provides responses back to the interpreter/controller 158 as well as optionally to other resources within the system based on updates to the entries. The interpreter/controller 158 can employ the updated response information from the snoop engine 160 to update the directory RAM 156. The interpreter/controller 158 can also employ the responses to update the cache 162.

The directory system 150 can also include a directory scrubber 170. The directory scrubber 170 is programmed and/or configured to walk through the associated address space supported by the filter system 140 for selectively reclassifying data from a global (or external) classification to a local classification. Those skilled in the art will understand and appreciate that if a greater amount of data is classified as local, there is an increased likelihood that the snoop engine 160 will less frequently broadcast snoops over global interconnects. The decrease in global snoop traffic will result in a corresponding increase the amount of interconnect bandwidth that may be available for various purposes. The increase in available interconnect bandwidth further facilitates scaling to larger capacity systems without overloading existing overhead.

By way of example, the directory scrubber 170 is programmed with a desired starting address and walks through the address space. When an active line of data is encountered, the directory scrubber 170 provides an instruction to the interpreter/controller 158 to cause the snoop engine 160 to issue a flush command (e.g., an invalidate command) to a corresponding memory block. For instance, the flush command can be provided to a single line of data or to plural lines, such as a page. If the flush command does not result in another device (e.g., an I/O controller or processor) generating a new request for the data, the interpreter/controller 158 provides a corresponding instruction to the directory 154 to set the block of data to the local state. This can be implemented in connection with a current copy of the data being transferred to a corresponding memory location in the local coherency domain.

Alternatively, if a new request is generated for the data after the flush command has been implemented, the directory scrubber 170 provides no instruction to change the classification of the block of data to local. A new request for the flushed line of data will be generated, for example, when another device somewhere in the partition (e.g. in the global coherency domain) is actively processing the line. When a new request for the flushed data is detected, directory scrubber moves on to a next address, such that the data remains classified as global.

In order to implement the flushing operation, for example, the directory scrubber 170 can include a counter 172 and one or more comparators (e.g., address comparators) 174. The comparators 174 are utilized to ascertain whether another processor or I/O controller has provided a new request for the same address to which a flush instruction was issued by the directory scrubber 170. For example, the directory scrubber 170 maintains a queue or list of addresses for which flush commands have been issued and employs the counter 172 to determine the new request is received within a predetermined amount of time. That is, the counter 172 operates as a timer that enables the directory scrubber 170 to determine if another processor or I/O controller is using the data being flushed by the directory scrubber. The directory scrubber 170 can operate by sequentially flushing different lines of data or other size blocks of data through the data in the partition. In this way, the directory scrubber will cause unused data to be returned to the local coherency domain. By changing from the global domain to the local coherency domain, there will be a corresponding increase in available global interconnect bandwidth, which further enhances scalability.

Figure 5:
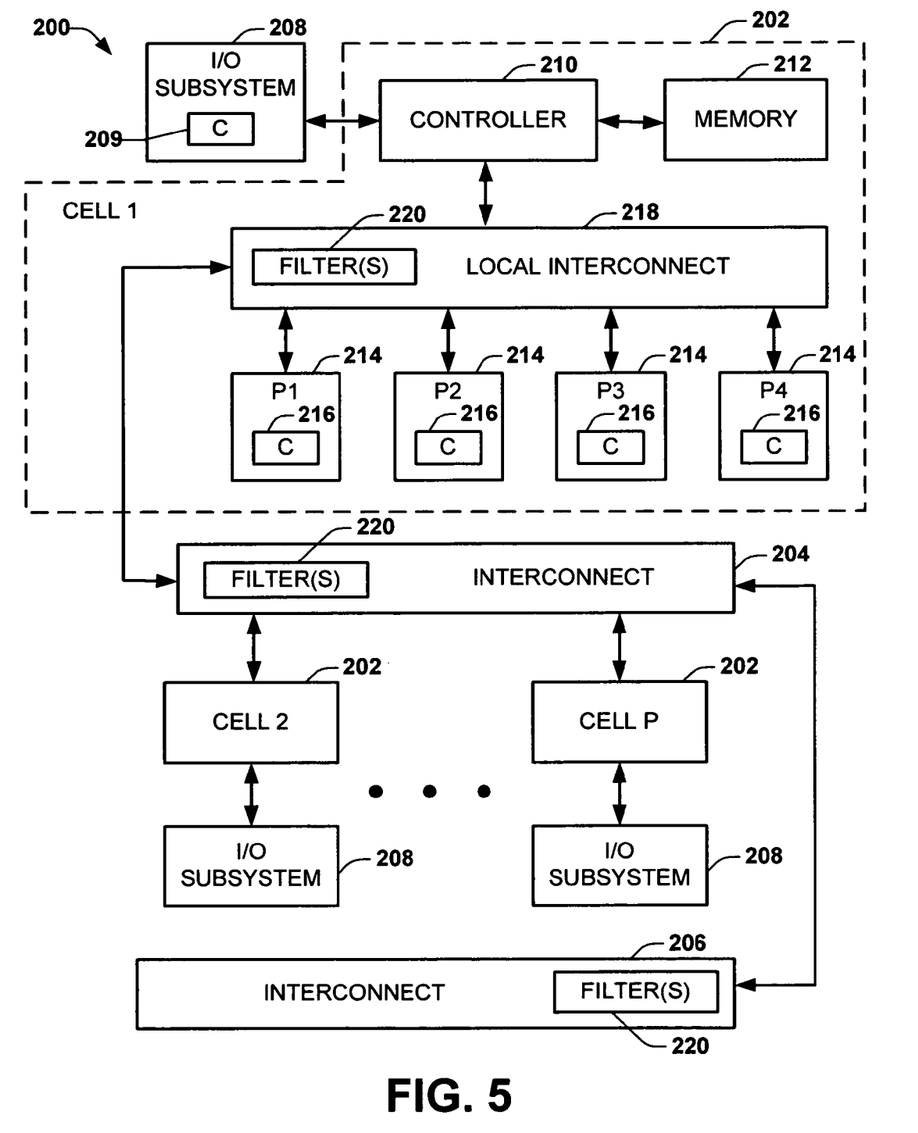
FIG. 5 depicts an example of a computer system that can implement an embodiment of a filter system.

FIG. 5 depicts a block diagram illustrating an example of a distributed-memory multi-processor system 200 employing coherency filtering. The system 200 includes a plurality of cells 202, indicated respectively at CELL 1, CELL 2 through CELL P, where P is an integer greater than or equal to one denoting the number of cells. Each of the cells 202, which can be implemented as a cell board, is communicatively coupled to other cells 202 via an interconnect 204, such as a backplane or crossbar circuitry (e.g., a scalability ASIC).

Additionally, another interconnect 206 can be coupled to the interconnect 204 for accessing another cell-based architecture that includes one or more other cells (not shown). The other cell-based architecture can be similarly configured to that shown and described in FIG. 3. The interconnect 206 provides for scalability to add additional cells (not shown), such as for implementing larger capacity systems. Those skilled in the art will understand and appreciate that the system 200 can be implemented with any number of cells.

An I/O subsystem 208 is associated with each of the cells 202. The I/O subsystem 208 can provide an interface or pathway for accessing an associated bus structure (e.g., a PCI bus structure) or other devices, such as through corresponding adapter (not shown). The I/O subsystem can also include a cache structure 209. Those skilled in the art will understand and appreciate various types of I/O devices and associated caches that can be accessed by or can access memory via the I/O subsystem 208. Additionally, the I/O subsystem 208 can be communicatively coupled to either the local or global interconnects 218 and 204, respectively to enable desired access. The I/O subsystem 208 can also be implemented to include an application specific integrated circuit (ASIC) that provides an interface between each respective cell 202 and a corresponding bus structure having one or more input/output devices coupled to the corresponding bus structure.

The system address space can be distributed across any portion of the cells in the system 200. The address space, including caches and main memory, further can be logically partitioned into any number of one or more memory regions or partitions. For instance, each processor, I/O controller and associated caches can be assigned to a respective partition. Within each partition, the memory address space further can be assigned to two or more logical classifications, such as a local coherency domain and a global coherency domain. Other classification approaches can be utilized in addition to or as an alternative to these classifications.

For purposes of brevity, the internal contents of CELL 1 are only shown, although those skilled in the art will understand and appreciate that each of the other respective cells 202 can be implemented in a similar manner. Alternatively, different configurations could be implemented relative to the different cells 202.

Turning to the contents of CELL 1, CELL 1 includes a controller 210 coupled to a main memory 212 of the cell. One or more central processing units (CPUs) 214 are also connected to the controller 210 for accessing the memory subsystem 212. While four CPUs P1, P2, P3 and P4 are depicted, those skilled in the art will appreciate that the system 200 can include any number of one or more CPUs. The controller 210 also is communicatively coupled to the I/O subsystem 208. Each of the CPUs 214 can include an associated cache 216 for storing data for local access by the CPU without requiring access to the memory subsystem 212. The CPUs 214 can implement a directory-based, null directory or broadcast-snoop based cache coherency protocol.

In the arrangement shown in FIG. 5, the CPUs 214 and the controller 210 each can be considered memory accessing devices operative to access data in the memory subsystem 212 via the controller 210 as well as the caches 216 distributed in the system 200. The controller 210 can include firmware, a configuration and status register (CSR) and an ordered access queue for accessing the data in the memory subsystem 212 and the I/O subsystem 208. The processors 214, memory 212 and I/O subsystem 208 are communicatively coupled to each other through the interconnect 218. The memory subsystem 212 can include any number of one or more memory modules, including one or more DIMM (dual in-line memory module)

or SIMM (single in-line memory module) memory device. As described herein, a memory partition can include selected parts of the address space in the memory subsystem 212, in the I/O subsystem and the caches 216 in any combination of one or more of the cells 202.

In the example of FIG. 5, coherency filters 220 are implemented in the interconnects 204 and 206. Additionally or alternatively, coherency filters can be implemented in the local interconnects 218 of the respective cells 202. It will thus be appreciated that the particular location of the coherency filtering is provided can vary from that shown and described herein. The coherency filters 220 can limit usage of the global interconnects 204 and 206 by selectively snooping coherency domains. Those skilled in the art will understand and appreciate various approaches to implement the coherency filters 220 based on the teachings herein (see, e.g., FIGS. 1-4). A separate filter can be provided for each partition in the multi-processor system 200. There further can be a configurable number of coherency domains within each partition.

As an example, two coherency domains may be defined for a given partition, such as local and global coherency domains. The filters 220 can be implemented as hardware, software or a combination of hardware and software, such as according to any of the embodiments described herein. For instance, in FIG. 5, the filters 220 can be implemented as an ASICS, such as in ports of a crossbar ASIC, which forms part of the respective interconnects 204, 206. The coherency filters 220 thus afford desired scalability in the multi-processor system 200 by limiting snoop traffic across the respective interconnects 204, 206 based on the coherency domain identified in the classification of data provided by the filters 220.

Figure 6:
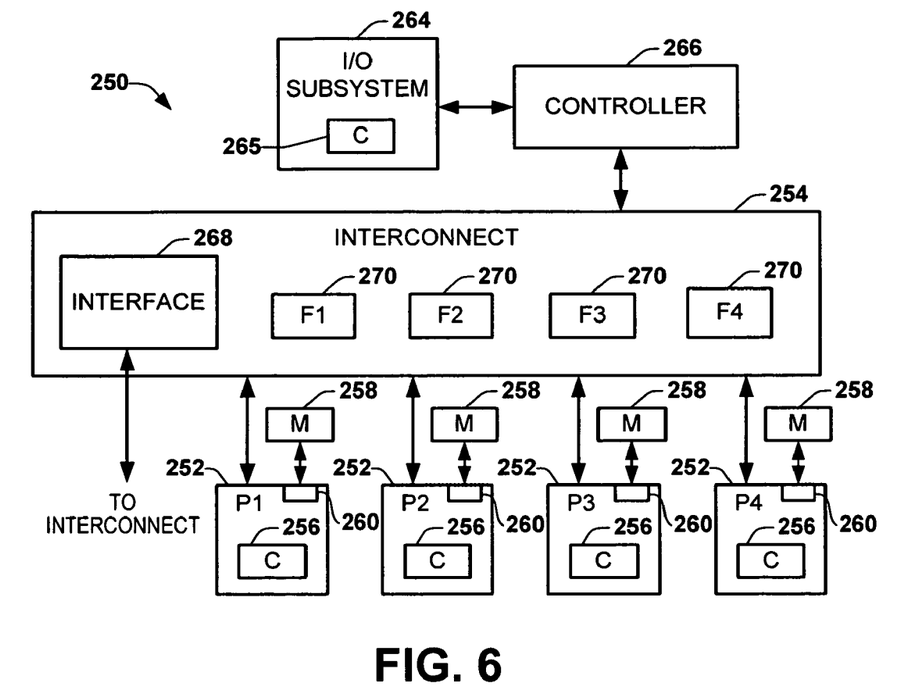
FIG. 6 depicts another example of a computer system that can implement an embodiment of a filter system.

FIG. 6 depicts an example of another multi-processor system 250 implementing coherency filtering. The system 250, for example, can correspond to a cell or other portion of a multi-processor system. The system 250 includes a plurality of processors 252 (indicated at P1, P2, P3 and P4) communicatively coupled via a local interconnect 254. While four processors P1, P2, P3 and P4 are depicted, those skilled in the art will appreciate that the system 250 can include any number of one or more processors.

In the example of FIG. 6, each of the processors 252 includes an associated cache 256. Memory 258 also is coupled to each of the processors 252, such as through a memory control interface 260. The memory control interfaces 260 can include firmware, one or more configuration and status registers (CSRs) and an ordered access queue for accessing data in the respective memories 258. Each of the memories 258 can include one or more memory modules, such as one or more DIMM or SIMM memory devices. The memories 258 define shared main memory for the system 250, which any of the processors 252 can access locally via the interconnect 254.

The system 250 also includes an I/O subsystem 264 communicatively coupled to the interconnect 254 through an associated I/O controller 266. The I/O subsystem can also include a cache structure 265. Each of the processors 252 and the I/O subsystem 264 can communicate locally with each other through the interconnect 254 and controller 266. An interface 268 communicatively couples the interconnect 254 to one or more other interconnects (not shown), such as corresponding to a crossbar of a multi-cell system. The interface 268 thus can provide access to various other cells, which can include memory (local and global) associated with an arrangement of processors, memory and I/O subsystems. As a result, any memory accessing device, such as a processor 252, I/O controller 266 or main memory 258, can access memory in the global coherency domain through the interface 268. In the arrangement shown in FIG. 6, the memory accessing devices can access data in the memories 258 and caches 256 of the processors and caches 265 associated with the I/O subsystem 264.

A coherency filter system 270 is also associated with each of the processors 252. In the example of FIG. 6, the coherency filter system includes a plurality of filters, indicated as F1, F2, F3 and F4, each of which is operatively associated with a respective one of the processors P1, P2, P3 and P4. For example, the coherency filter systems 270 are embedded and integrated to provide desired coherency filtering that can be implemented for each respective processor 252 as part of the interconnect 254. As an example, the interconnect 254 thus can be implemented as a scalability ASIC or other circuitry that provides desired communication between memory accessing devices, which includes memory devices to provide desired coherency filtering, such as described herein.

The coherency filter systems 270 are operative to classify data according to predetermined coherency domains for the shared address space associated with each of the respective processors 252. For example, processors P1, P2 and P3 as well as the I/O subsystem 264 can be assigned to the local domain, and the processor P4 can be assigned to the global domain. The classification implemented by the coherency filter systems 270, for example, controls whether snoops are broadcast to a local coherency domain only or whether snoops are broadcast to a global coherency domain. The coherency filter systems 270 can be implemented based on any of the approaches shown and described herein (see, e.g., FIGS. 1-4).

Those skilled in the art will understand and appreciate that the multi-processor system 250 enables desired scalability since overhead is reduced for providing a robust broadcast-based snoopy cache coherency protocol. Additionally, a large number of processors can be interconnected without overloading the system fabric with coherency overhead. The approach also does not require utilizing the main memory 258 for implementing the coherency filter system 270, which affords reduced latency and improved scalability relative to other approaches utilized to implement directories.

Figure 7:
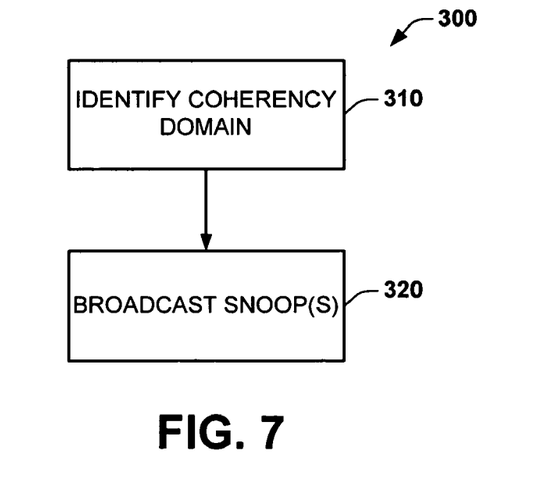
FIG. 7 depicts a flow diagram illustrating a method.

In view of the foregoing structural and functional features described above, certain methods will be better appreciated with reference to FIG. 7. It is to be understood and appreciated that the illustrated actions, in other embodiments, may occur in different orders and/or concurrently with other actions. Moreover, not all illustrated features may be required to implement a method. It is to be further understood that the following methodologies can be implemented in hardware (e.g., as one or more integrated circuits or circuit boards containing a plurality of microprocessors), software (e.g., as executable instructions running on one or more processors or controllers), or any combination thereof.

FIG. 7 depicts a method 300 that comprises identifying a coherency domain for a block of data based on an address associated with the block of data, as illustrated at 310. The method also includes broadcasting at least one snoop for accessing the block of data in a region of an associated address space based on the identified coherency domain and the address, as illustrated at 320.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A system comprising:
   a coherency filter that provides information identifying one of at least two coherency domains for data in an associated address space based on an identifier for the data, wherein the at least two coherency domains comprise a local coherency domain and a global coherency domain, the address space comprising a partition having at least two subregions communicatively coupled to each other to form a shared address space for the partition, each of the at least two subregions of the partition corresponding to a respective one of the at least two coherency domains; and
   a snoop engine configured to snoop for the data in the local coherency domain based on the information and the identifier classifying the data as local, the snoop engine being configured to snoop for the data in the global coherency domain based on the information and the identifier classifying the data as global, wherein the snoop engine selectively directs snoops to memory of one of the at least two subregions based on the information provided by the coherency filter and based on information identifying a set of potential owners of the data in each of the at least two subregions, the information provided by the coherency filter identifying to which of the at least the two coherency domains the data is assigned.

2. The system of claim 1, wherein the identifier comprises a tag address associated with a transaction for accessing the data.

3. The system of claim 1, wherein the coherency filter further comprises a directory that provides classification data that identifies one of the at least two coherency domains in the address space for the data based on the identifier, the snoop engine snooping memory for the data based on the classification data and the identifier.

4. The system of claim 3, wherein the classification data indicates a relative proximity of a set of one or more potential owners of the data in the address space.

5. The system of claim 1, wherein the local coherency domain further comprises a set of at least one input/output controller in the partition.

6. The system of claim 1, wherein the global coherency domain further comprises a set of at least one input/output controller and cache of at least one associated processor communicatively coupled with the coherency filter via a global interconnect.

7. The system of claim 1, wherein the global coherency domain further comprises caches associated with a plurality of processors distributed across a plurality of cells, and the local coherency domain comprises caches communicatively coupled within one of the plurality of cells.

8. The system of claim 1, wherein the coherency filter further comprises a plurality of comparators, each being operative to provide a logical output that identifies one of at least two subregions of the address space, each of the at least two subregions of the address space defining a respective coherency domain.

9. The system of claim 1, wherein the coherency filter is located remotely from main memory of a multi-processor system.

10. A distributed memory, multi-processor system comprising the system of claim 1, the multi-processor system comprising:
    a plurality of processors, each of the plurality of processors having at least one associated cache, each of the processors and the at least one associated cache thereof being assigned to one of the at least two coherency domains.

11. A system comprising:
    a coherency filter that provides information identifying one of at least two coherency domains for data in an associated address space based on an identifier for the data, wherein the at least two coherency domains comprise a local coherency domain and a global coherency domain, the coherency filter comprising:
      a mapping system that provides a tag address to identify a block of memory based on the identifier, the block of memory including the data; and
      a directory that provides classification data that identifies one of the at least two coherency domains in the address space for the block of memory based on the tag address; and
    a snoop engine configured to selectively snoop for the data in the local coherency domain based on the classification data and the identifier classifying the data as local, the snoop engine being configured to selectively snoop for the data in the global coherency domain based on the classification data and the identifier classifying the data as global.

12. The system of claim 11, wherein the block of memory corresponds to a page of data.

13. The system of claim 11, wherein the directory further comprises:
    a directory memory that provides first classification data that identifies one of the at least two coherency domains in the address space; and
    a directory cache that provides second classification data that identifies an owner of the block of data based on the tag address, the classification data provided by the directory cache structure identifying the owner of the block of data with greater specificity than the classification data provided by the directory memory.

14. The system of claim 11, further comprising an interpreter/controller that provides interpreted classification data to the snoop engine to enable the snooping for the data, the interpreter/controller updating the directory to maintain current classification data for each of the at least two coherency domains based on snoop responses received by the snoop engine.

15. The system of claim 11, further comprising a scrubber system that provides an instruction for a block of data in a global memory region of the address space for modifying the coherency domain for the block of the data to one of the at least two coherency domains that defines a local subregion of the address space.

16. A multi-processor system comprising:
    caches associated with a plurality of memory accessing devices located in the multi-processor system, the caches defining at least a portion of an associated address space;
    a first interconnect that communicatively couples a first set of the plurality of memory accessing devices to each other locally;
    a second interconnect that communicatively couples the first set of plurality of memory accessing devices to at least a second set of the plurality of memory accessing devices; and
    a filter system operative to identify one of at least two coherency domains based on an identifier associated with a block of data, the at least two coherency domains defining the associated address space that is supported by the filter system, at least one snoop for the block of data being selectively sent via at least one of the first and second interconnects based on which one of the at least two coherency domains is identified by the filter system for the block of data, the filter system comprising:

a directory that provides classification data that identifies the one of the at least two coherency domains in the address space for the block of data based on the identifier; and an associated snoop engine that selectively directs snoops in the multi-processor system for the block of data based on the classification data and the identifier;

wherein the classification data indicates a relative proximity of a set of one or more potential owners of the block of data in the address space.

17. The multi-processor system of claim 16, wherein the address space comprises a partition having at least two subregions communicatively coupled to each other via at least the first and second interconnects to define a shared address space for the partition, each of the at least two subregions of the partition including at least one of the caches and associated memory accessing devices that are assigned to a respective one of the at least two coherency domains.

18. The multi-processor system of claim 17, wherein the at least two coherency domains comprise a local coherency domain and a global coherency domain, the local coherency domain comprising at least a substantial portion of the first set of the plurality of memory accessing devices and the caches associated with the first set of the plurality of memory accessing devices, such that the at least one snoop is sent via the first interconnect based on the filter system identifying the local coherency domain for the block of data.

19. The multi-processor system of claim 18, wherein the global coherency domain comprises portions of the caches and associated memory accessing devices of the first set of the plurality of memory accessing devices and the at least a second set of the plurality of memory accessing devices.

20. The multi-processor system of claim 16, wherein each of the memory accessing devices comprises a device selected from the group comprising a processor, an input/output controller and a memory controller.

21. The multi-processor system of claim 16, wherein the filter system further comprises:

a mapping system that provides a tag address to a identify an aggregate block of memory that includes the block of data based on the identifier.

22. The system of claim 21, wherein the aggregate block of memory corresponds to a page of data.

23. The system of claim 21, further comprising a directory cache that provides second classification data that identifies an owner of the block of data based on the tag address, the classification data provided by the directory cache identifying the owner of the block of data with greater specificity than the classification data provided by the directory.

24. The multi-processor system of claim 21, further comprising an interpreter/controller that provides interpreted classification data to the snoop engine to enable the snooping for the block of data, the interpreter/controller updating the directory with updated classification data for each of the at least two coherency domains based on snoop responses received by the snoop engine.

25. The system of claim 24, wherein the at least two coherency domains comprise at least a local coherency domain and a global coherency domain.

26. The multi-processor system of claim 16, further comprising a scrubber system operative to modify the coherency domain for blocks of data in a global memory region from a global coherency domain to a local coherency domain.

27. A system, comprising:

means for identifying a coherency domain associated with a block of data in an address space;

means for selectively targeting snoops for the data to a subregion of the address space based on the identified coherency domain and based on an address that identifies the data means for mapping the address to a block tag address, the block tag address corresponding to an aggregate block of memory in the address space that includes the block of data; and means for classifying the aggregate block of memory in one of at least two coherency domains in the address space for based on the block tag address, the means for selectively targeting the snoops being operative to direct snoops based on the classification data and the address.

28. The system of claim 27, wherein each of the at least two coherency domains indicates a proximity of a set of one or more potential owners of the data in the address space relative to the means for selectively targeting snoops.

29. The system of claim 27, wherein the address space comprises a partition having at least two subregions, the system further comprising means for communicatively coupling the at least two subregions to each other to provide a shared address space for the partition, each of the at least two subregions of the partition being associated with a respective one of at least two coherency domains, the means for selectively targeting snoops broadcasting at least one snoop to a selected one of the at least two subregions based on the identified coherency domain.

30. A method comprising:

identifying a coherency domain for a block of data based on an address associated with the block of data;

broadcasting at least one snoop for accessing the block of data in a region of an associated address space based on the identified coherency domain and the address mapping the address to a block tag address corresponding to an aggregate block of memory in the address space that includes the block of data; and classifying the block of data in one of at least two coherency domains based on the block tag address, the at least two coherency domains defining the address space.

31. The method of claim 30, further comprising employing cache to identify an owner of the block of data based on a second tag address provided by mapping the address, the owner of the block of data being identified with greater specificity than the at least two coherency domains in which the block of data can be classified.

32. The method of claim 30, wherein the address space comprises at least two coherency domains comprising a local coherency domain and a global coherency domain.

33. The method of claim 30, further comprising selectively causing blocks of data in a global memory region of the address space to be reassigned to a local coherency domain.

* * * * *

UNITED STATES PATENT AND TRADEMARK OFFICE
CERTIFICATE OF CORRECTION

PATENT NO.       : 7,434,008 B2                                              Page 1 of 1
APPLICATION NO.  : 10/831050
DATED            : October 7, 2008
INVENTOR(S)      : Mark Shaw It is certified that error appears in the above-identified patent and that said Letters Patent is hereby corrected as shown below:

In column 19, line 45, in Claim 21, after "address to" delete "a".

Signed and Sealed this

Third Day of March, 2009

JOHN DOLL
*Acting Director of the United States Patent and Trademark Office*